United States Patent
Zhang (10) Patent No.: US 8,060,737 B2
(45) Date of Patent: Nov. 15, 2011

(54) METHOD AND APPARATUS FOR PREVENTING BIOS FROM FAILING TO ENTER BOOT PROGRAM

(75) Inventor: Jin Zhang, Kunshan (CN)

(73) Assignees: Micro-Star Int'l Co., Ltd., Jung-He (TW); MSI Electronic (Kun Shan) Co., Ltd., Kunshan (CN)

( * ) Notice: Subject to any disclaimer, the term of this patent is extended or adjusted under 35 U.S.C. 154(b) by 466 days.

(21) Appl. No.: 12/425,399

(22) Filed: Apr. 17, 2009

(65) Prior Publication Data

US 2010/0268926 A1    Oct. 21, 2010

(51) Int. Cl.
  *G06F 15/177*  (2006.01)
(52) U.S. Cl. .................. 713/2; 713/1; 711/202; 714/53
(58) Field of Classification Search .................. 713/1, 2; 711/202; 714/53
See application file for complete search history.

(56) References Cited

U.S. PATENT DOCUMENTS

| | | | | |
|---|---|---|---|---|
| 5,355,498 A | * | 10/1994 | Provino et al. | 713/2 |
| 5,522,076 A | * | 5/1996 | Dewa et al. | 713/2 |
| 5,799,186 A | * | 8/1998 | Compton | 713/2 |
| 7,822,965 B2 | * | 10/2010 | Li et al. | 713/2 |

* cited by examiner

*Primary Examiner* — Thuan Du
(74) *Attorney, Agent, or Firm* — Ditthavong Mori & Steiner, P.C.

(57) ABSTRACT

A method and an apparatus for preventing a basic input/output system (BIOS) from failing to enter a boot program are adapted to solve the problem that when a central processing unit (CPU) executes a first instruction after a computer is powered on, a start address to be executed is erroneously set as another corresponding start address, resulting in that a BIOS cannot enter a boot program. In the method of the present invention, a jump instruction is written to the corresponding start address, so as to enable an execution instruction to jump to a boot block of the BIOS when the start address is erroneously set in the computer, thus performing a normal boot operation. Moreover, in the present invention, a step for checking a register that may cause the start address to be inverted to the corresponding start address is further added to the BIOS program, such that in each boot process, the value of the register can be pre-checked and overwritten when an error occurs, so as to avoid the problem of false pointing next time the computer is booted.

18 Claims, 6 Drawing Sheets

METHOD AND APPARATUS FOR PREVENTING BIOS FROM FAILING TO ENTER BOOT PROGRAM

BACKGROUND OF THE INVENTION

1. Field of Invention

The present invention relates to a computer basic input/output system (BIOS), in particular, to a method and an apparatus for preventing a BIOS from failing to enter a boot program.

2. Related Art

A basic input/output system (BIOS) is the most basic software program code loaded into a computer hardware system. The main function of the BIOS includes: performing a power on self test (POST), i.e., checking whether a central processing unit (CPU) and controllers are in a normal status; initializing the memory, mainboard chipset, display adapter, and peripheral devices; recording setting values of the system, i.e., providing basic settings for the display, keyboard, processor, memory, and other system components; providing a routine library, i.e., providing interrupt routines called by the operating system or the application program; loading the operating system, i.e., loading the operating system from the memory to a random access memory (RAM); and the like.

Figure 1:
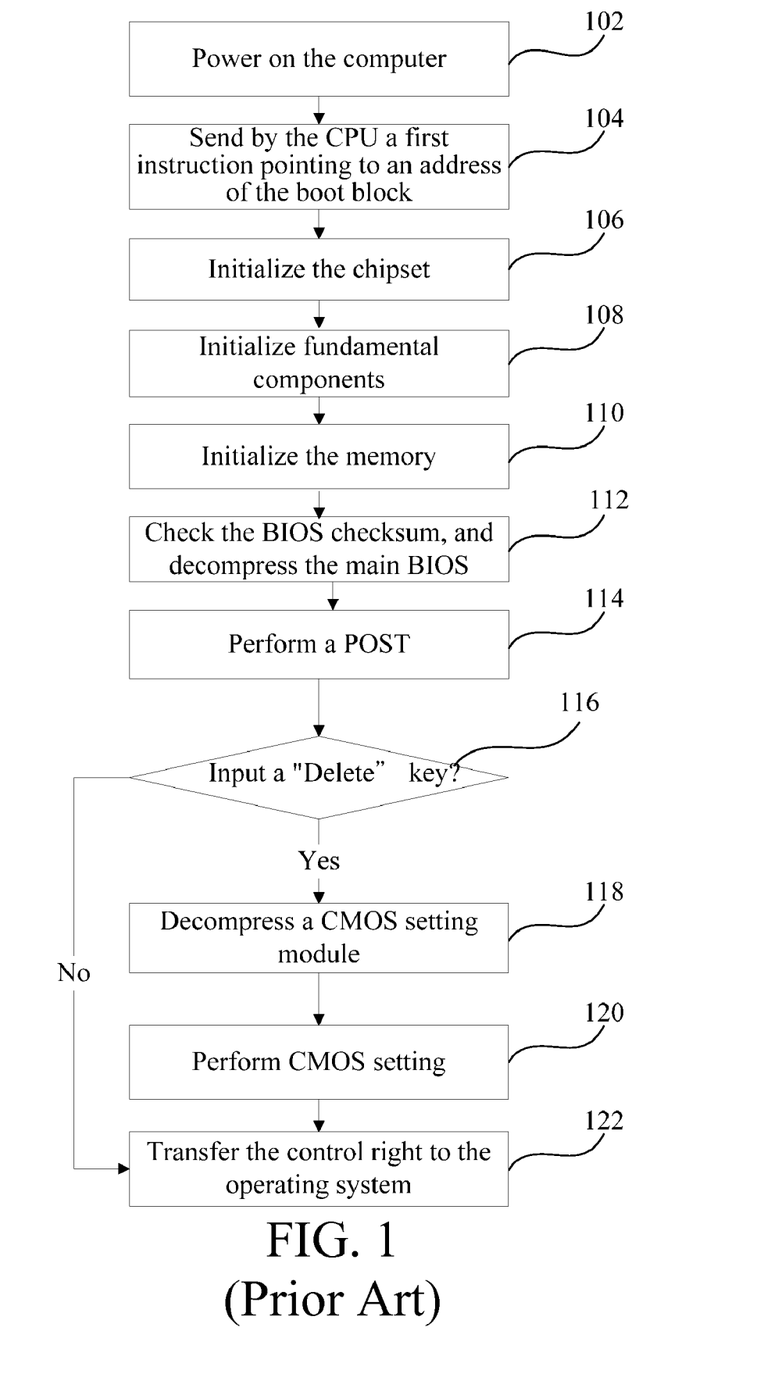
FIG. 1 is a flow chart of a BIOS boot program in the prior art.

With the above basic functions, the BIOS can be regarded as a mini operating system in communication with the hardware, and it is generally written in an assembly language compatible with the CPU. As the BIOS is a mini operating system program executed first after the computer is powered on, the normal operation thereof is the way to the normal operation of the computer. The BIOS includes two main components, namely, a boot block and a main BIOS. FIG. 1 is a flow chart of a BIOS boot program, including the following steps.

In Step 102, the computer is powered on.

In Step 104, the CPU sends a first instruction pointing to an address of the boot block.

In Step 106, the chipset is initialized.

In Step 108, fundamental components are initialized.

In Step 110, the memory is initialized.

In Step 112, the BIOS checksum is checked, and the main BIOS is decompressed.

In Step 114, a POST (Power on self test) is performed.

In Step 116, it is determined whether a "Delete" key is input, and if yes, Step 118 is performed; otherwise, Step 122 is performed.

In Step 118, a complementary metal-oxide-semiconductor (CMOS) setting module is decompressed.

In Step 120, CMOS setting is performed.

In Step 122, the control right is transferred to the operating system.

The boot block is a specific region in the BIOS, which is non-compressed and stored in a fixed address space, and is the first part to be executed when the computer is booted. The boot block is mainly responsible for performing the most basic and simplest initialization on the computer hardware, and then decompressing and sequentially executing other modules of the main BIOS. The boot block contains a minimum instruction set for booting, and the first address of the CPU pointing to the read-only memory (ROM) space that stores the BIOS program when the computer is booted is located at the boot block. Once data in the boot block is destroyed or lost, the BIOS cannot boot the computer, and the BIOS must be reset.

In actual production and applications, a problem that the computer still cannot be booted when the boot block is not destroyed may occur. At this time, it has no effect to reset the BIOS, and the computer cannot be normally booted unless the CMOS is cleared or the computer is powered off and then powered on again. However, after being used for a period of time, the same problem may randomly occur. Thereby, the users may consider that the problem is caused by the instability of the system, and become dissatisfied with the computer manufacturers.

The above-mentioned problem usually occurs to mainboards using Intel south bridge chips (for example, models ICH6, ICH7, ICH8, ICH9, and ICH10), and is reflected in the BIOS by a change in the first BIOS ROM space address read by the CPU. The address originally points to the boot block, but actually points to another block (generally a neighboring block at a lower level). As the other block does not contain programs necessary for booting, the computer cannot be booted.

Such an error in the BIOS execution address of the first instruction after the CPU is powered on is generally caused by an abnormality in a certain register of the south bridge (which is a top swap bit (TSB) in the register by taking an Intel chip as an example). Generally, three methods are provided for resolving the error. 1. If the register is powered by a voltage (for example, VCC3) generated when the computer is powered on, the value of the register is usually automatically restored after the computer is powered off, and may not affect the next boot operation. 2. If the register is powered by a standby voltage (for example, 3VSB), and an error occurs in the value of the register, the computer cannot be booted unless the power supply is unplugged. 3. If the register is powered by a battery on the mainboard, and an error occurs in the value of the TSB register, the computer cannot be booted unless the battery is removed or the CMOS data is cleared by a jumper.

The reason 1 basically has no effect on the boot process, while the reasons 2 and 3 may seriously affect the use of the computer. It is found in actual production that as an abnormality randomly occurs to a register of the south bridge on the mainboard, an error may occur in the execution address of the first instruction after the CPU is powered on, resulting in that the BIOS cannot boot the computer. In this case, default settings of the register of the south bridge must be restored by removing the CMOS battery or powering off and then powering on the computer, which is rather inconvenient for the users.

Therefore, the problem that the BIOS cannot boot the computer due to an error in the execution address of the first instruction after the CPU is powered on needs to be solved, so as to avoid customer complaints and user dissatisfaction.

SUMMARY OF THE INVENTION

Accordingly, the present invention is directed to a method and an apparatus for preventing a basic input/output system (BIOS) from failing to enter a boot program, so as to effectively solve the problem that the BIOS cannot boot the computer due to an error in the execution address of the first instruction after the CPU is powered on.

In order to resolve the above problem, the present invention provides a method for preventing a BIOS from failing to enter a boot program, which is applicable to a computer. The computer includes a CPU, a south bridge chip, and a memory. The CPU has a first instruction to be executed after the computer is powered on. The south bridge chip includes: a start address register, adapted to register a start address; and a start address control register, adapted to control a value of the start address. The memory includes: a boot block, pointed to by the start address, and adapted to record the boot program of the BIOS;

and an inverted corresponding block, pointed to by a corresponding start address, in which a value of the corresponding start address is a value of the start address register when the start address control register is erroneously set. The method includes: obtaining the corresponding start address of the inverted corresponding block; setting a jump instruction to the corresponding start address of the inverted corresponding block, in which the jump instruction is adapted to record the start address so as to point an execution address to the boot block; turning on a power supply of the computer system, and executing, by the CPU, the first instruction; and executing the jump instruction so as to run the boot program, when the CPU points to the corresponding start address of the inverted corresponding block.

When the start address control register is erroneously set, a default value of 0 of a top swap bit (TSB) of the start address control register is set to 1, and the value of the start address of the start address register is converted to the value of the corresponding start address.

The present invention further provides a method for preventing a BIOS from failing to enter a boot program, which is applicable to a computer. The computer includes a CPU and a south bridge chip. The CPU has a first instruction to be executed after the computer is powered on. The south bridge chip includes: a start address register, adapted to register a start address; and a start address control register, having a register value and a default value, and adapted to control a value of the start address. The method includes: turning on a power supply of the computer system, and executing, by the CPU, the first instruction; comparing whether the register value is equal to the default value of the start address control register or not; executing the boot program, if the register value is equal to the default value; and replacing the register value with the default value, if the register value is not equal to the default value.

The present invention further provides a method for preventing a BIOS from failing to enter a boot program, which is applicable to a computer. The computer includes a CPU and a south bridge chip. The CPU has a first instruction to be executed after the computer is powered on. The south bridge chip includes: a start address register, adapted to register a start address; a start address control register, having a first register value and a default value, and adapted to control a value of the start address; and a start address lock register, adapted to store a second register value and lock the first register value of the start address control register as the default value. The method includes: turning on a power supply so as to execute the first instruction; comparing whether the first register value is equal to the default value of the start address control register or not; replacing the first register value with the default value, if the first register value is not equal to the default value; writing a value of Boot Lock to the start address lock register, if the first register value is equal to the default value; and executing the boot program.

The present invention further provides an apparatus for preventing a BIOS from failing to enter a boot program, which is applicable to a computer including a CPU and a south bridge chip. The south bridge chip includes: a start address register, adapted to register a start address; and a start address control register, having a first register value and a default value, and adapted to control a value of the start address. The apparatus includes a BIOS memory, and the memory contains a program including: comparing whether the first register value is equal to the default value of the start address control register or not; executing the boot program, if the first register value is equal to the default value; and replacing the first register value with the default value, if the first register value is not equal to the default value.

The detailed features and advantages of the present invention will be described in detail in the following embodiments. Those skilled in the arts can easily understand and implement the content of the present invention. Furthermore, the relative objectives and advantages of the present invention are apparent to those skilled in the arts with reference to the content disclosed in the specification, claims, and drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 2:
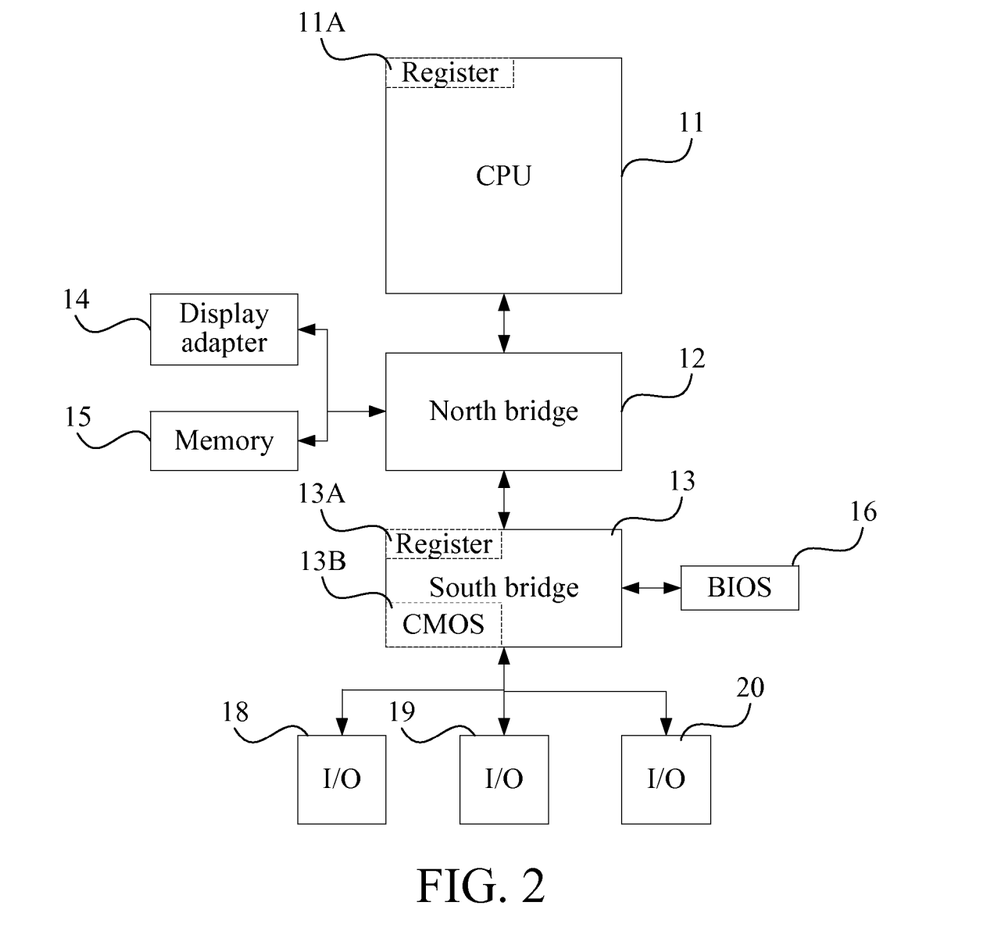
FIG. 2 is a functional block diagram of a computer system according to the present invention.

FIG. 2 is a functional block diagram of an ordinary computer mainboard 10. The computer mainboard 10 includes a CPU 11, a north bridge 12, a south bridge 13, a display adapter 14, a memory 15, a BIOS 16, an I/O 18, an I/O 19, and an I/O 20. The CPU 11 is connected to the south bridge 13 via the high-speed north bridge 12, and extracts a program of the BIOS 16 via the south bridge 13. The BIOS 16 as mentioned above is generally stored in a ROM, and may also be stored in a flash memory. A register 13A in the south bridge 13 may be instructed by a program and perform various control operations. In addition, a CMOS 13B is generally constituted by a static RAM (SRAM) in the south bridge 13, and may store a set value of the mainboard. The CPU 11 includes a register 11A adapted to register program codes and operands.

Figure 3:
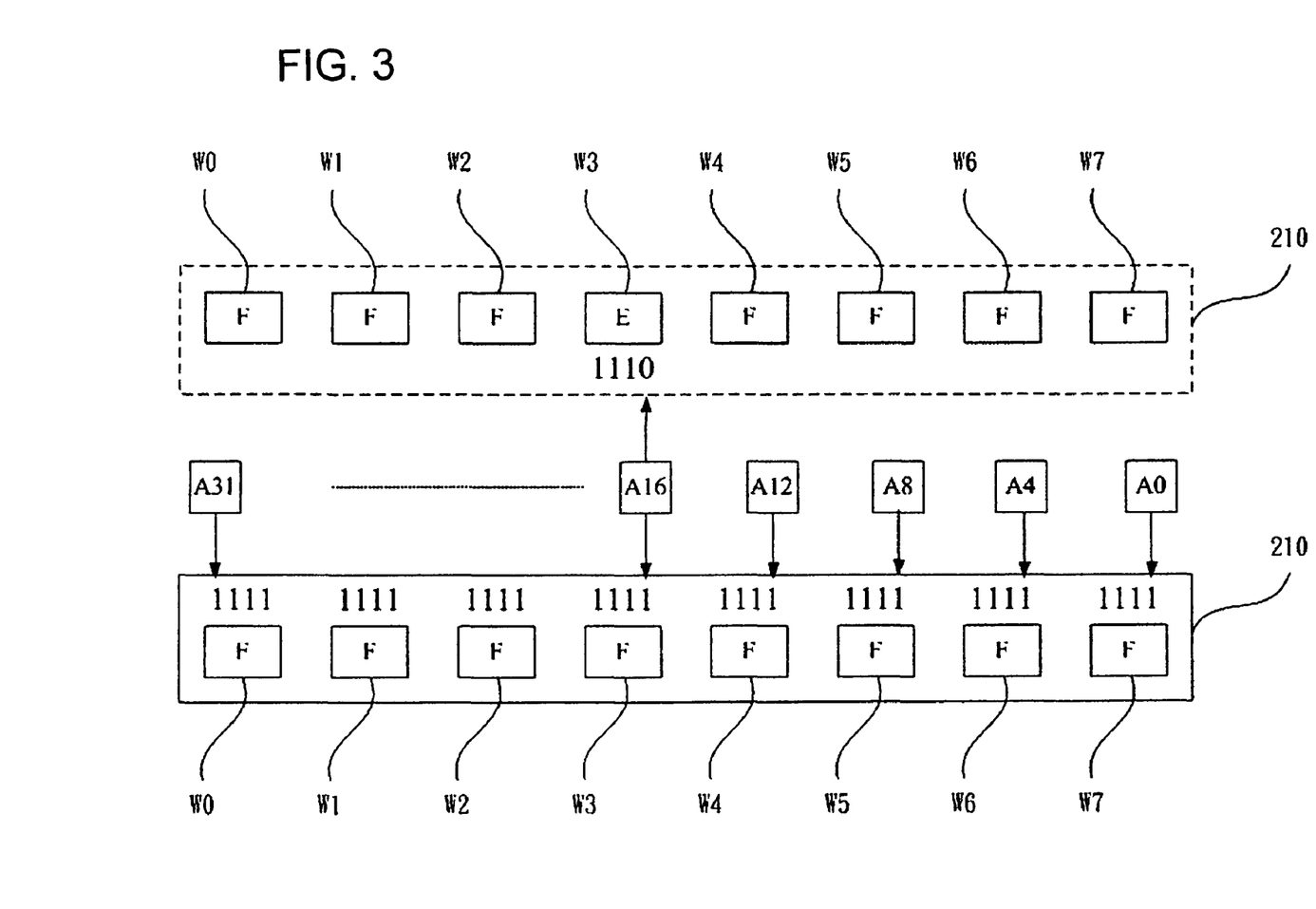
FIG. 3 is a schematic view of an error in the value of the start address register of the south bridge chip after the BIOS is powered on and the first instruction is executed, in which the error is caused by an abnormality in the TSB.

FIG. 3 is a schematic view of an error in the address pointed to by the first instruction of the register of the south bridge chip after the BIOS is powered on due to an abnormality in the TSB. A boot logic analysis is performed by a logic analyzer on the mainboard BIOS where the problem occurs, and it is determined that the problem is caused by an abnormal change of the TSB of a register of the Intel south bridge. A default value of the register is "0", but may be randomly set to "1" during the power on/off process.

In a normal condition, a start address register 210 in the south bridge chip records a value of a start address for a boot block of the BIOS, i.e., FFFF_FFFFh. A default value of a $16^{th}$ bit A16 is "1". When the first instruction points to an address (FFFF_0000h-FFFF_FFFFh, formed by a $0^{th}$ half byte W0, a $1^{st}$ half byte W1, a $2^{nd}$ half byte W2, a $3^{rd}$ half byte W3, a $4^{th}$ half byte W4, a $5^{th}$ half byte W5, a $6^{th}$ half byte W6, and a $7^{th}$ half byte W7) of the boot block of the BIOS via the south bridge after the CPU is powered on, the south bridge transfers the value of the start address to the CPU, and points to the boot block of the BIOS.

If a TSB in a start address control register in the south bridge chip is set to "1" before the computer is booted, the $16^{th}$ bit A16 of the start address register 210 will be inverted to "0". Thus, when the first instruction points to the address (FFFF_0000h-FFFF_FFFFh) of the boot block of the BIOS via the south bridge after the CPU is powered on, as the $16^{th}$ bit A16 is inverted to "0", and the address provided by the south bridge to the CPU is changed to an address (FFFE_0000-FFFE_FFFFh) of a previous inverted corresponding block of the boot block, that is, a value of the start address register 210 is changed to FFFE_FFFF, the CPU receives a value pointing to the address of the inverted corresponding block. However, the inverted corresponding block does not contain data necessary for booting, so that the mainboard cannot be booted.

As it is determined that such an error in the value of the start address when the computer is booted is caused by the fact that the TSB is randomly set to "1", the system is adjusted accordingly in the present invention, thus preventing the problem that the computer cannot be booted due to such an error.

Figure 4:
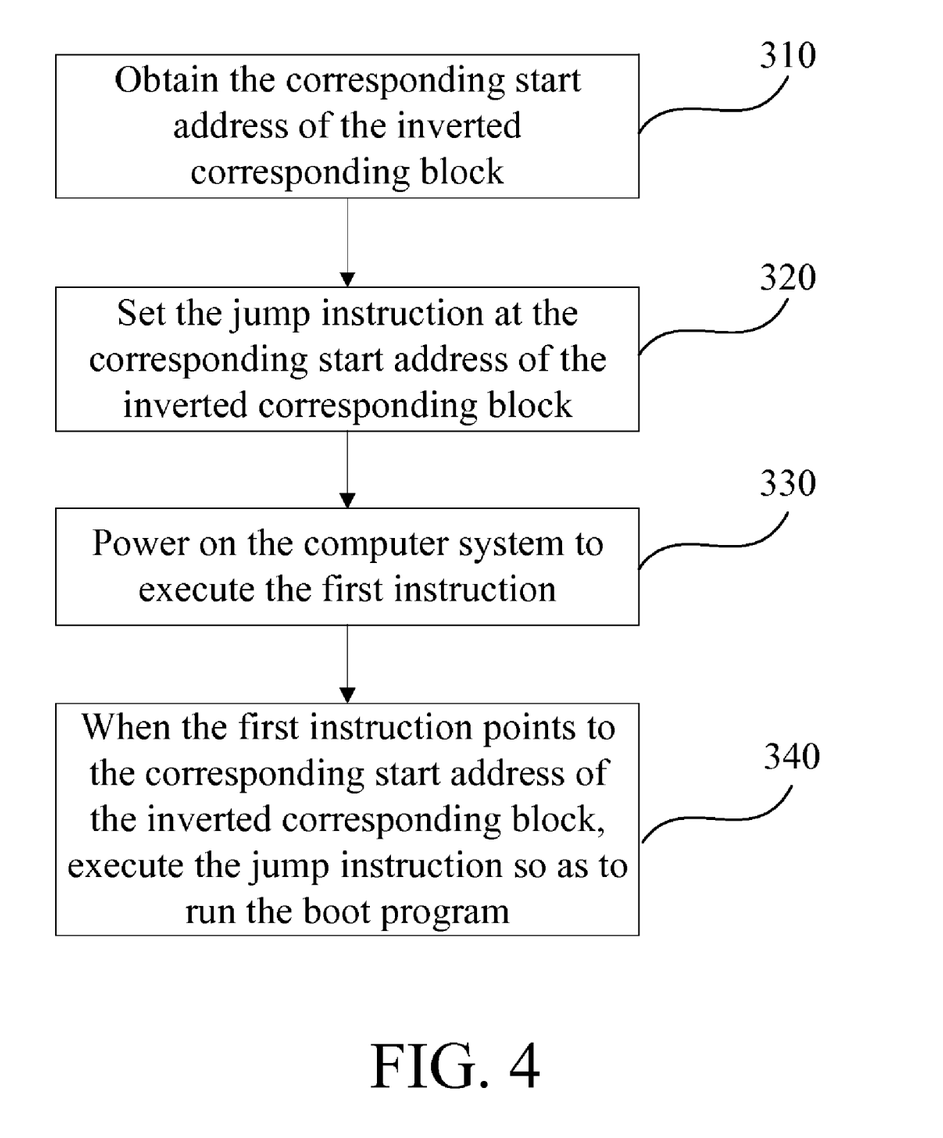
FIG. 4 is a flow chart of a method for preventing a BIOS from failing to enter a boot program according to the present invention.

FIG. 4 is a flow chart of a method for preventing a BIOS from failing to enter a boot program according to the present invention. A computer system used herein basically includes a CPU, a BIOS memory, and a south bridge chip. The BIOS memory includes a boot block and an inverted corresponding block. The south bridge chip includes a start address register and a start address control register. A default value of the start address register is a start address. The start address control register is responsible for controlling a value of the start address register, and a TSB is located in the start address control register. The boot block is pointed to by the start address, and adapted to record the boot program of the BIOS. The inverted corresponding block is pointed to by a corresponding start address, and a value of the corresponding start address is a stored value of the start address register when the start address control register is erroneously set. The method of FIG. 4 includes the following steps.

In Step 310, the corresponding start address of the inverted corresponding block is obtained. A jump instruction is stored at a first start address of the inverted corresponding block, and the inverted corresponding block is a block with an address that can be obtained in advance. The inverted corresponding block is pointed to by the first instruction executed by the CPU after being powered on when the TSB in the south bridge chip is erroneously set, i.e., the above-mentioned false address.

In Step 320, the jump instruction is set at the corresponding start address of the inverted corresponding block. The jump instruction is adapted to record the start address to provide the CPU with a value of the start address, so as to enter the boot block of the BIOS to obtain an operation instruction.

In Step 330, the computer system is powered on to execute the first instruction.

In Step 340, when an address obtained by the first instruction is the corresponding start address pointing to the inverted corresponding block, the jump instruction is executed so as to run the boot program.

As shown in FIG. 3, an address of the inverted corresponding block is FFFE_0000-FFFE_FFFFh, which can be determined in advance as it origins from the erroneously set TSB.

As long as a jump instruction is written to the start address of the inverted corresponding block in advance, and the jump instruction points to the start address representing the boot block of the BIOS, the execution address can be pointed to the start address of the boot block again when a problem occurs due to an error in the value of the start address of the first instruction in the BIOS executed by the CPU after the computer is powered on, thereby normally running the boot program of the BIOS. Any problem of false address pointing of the first instruction due to the TSB can be solved by the steps in FIG. 4, unless the memory of the BIOS is destroyed.

However, the method of FIG. 4 is applied when the TSB is abnormally set. In a normal boot condition, if a TSB register default value check program is added to the BIOS, the error is further prevented, such that the computer can be normally booted next time. This is a second protection mechanism provided by the present invention.

However, during the BIOS execution, if only the jump operation of FIG. 4 is executed, the BIOS cannot know whether an address inversion occurs or not. Therefore, the method of FIG. 4 is employed for preventing the inversion from randomly occuring. Moreover, the objective of the present invention may still be achieved by using FIG. 4 alone; however, a false address may be pointed to each time the computer is booted after the address inversion. The method of FIG. 5 is performed each time the BIOS program is executed, so as to modify a register value of the TSB to a default value "0" after the computer is correctly booted, therey preventing false address pointing next time the computer is booted.

Figure 5:
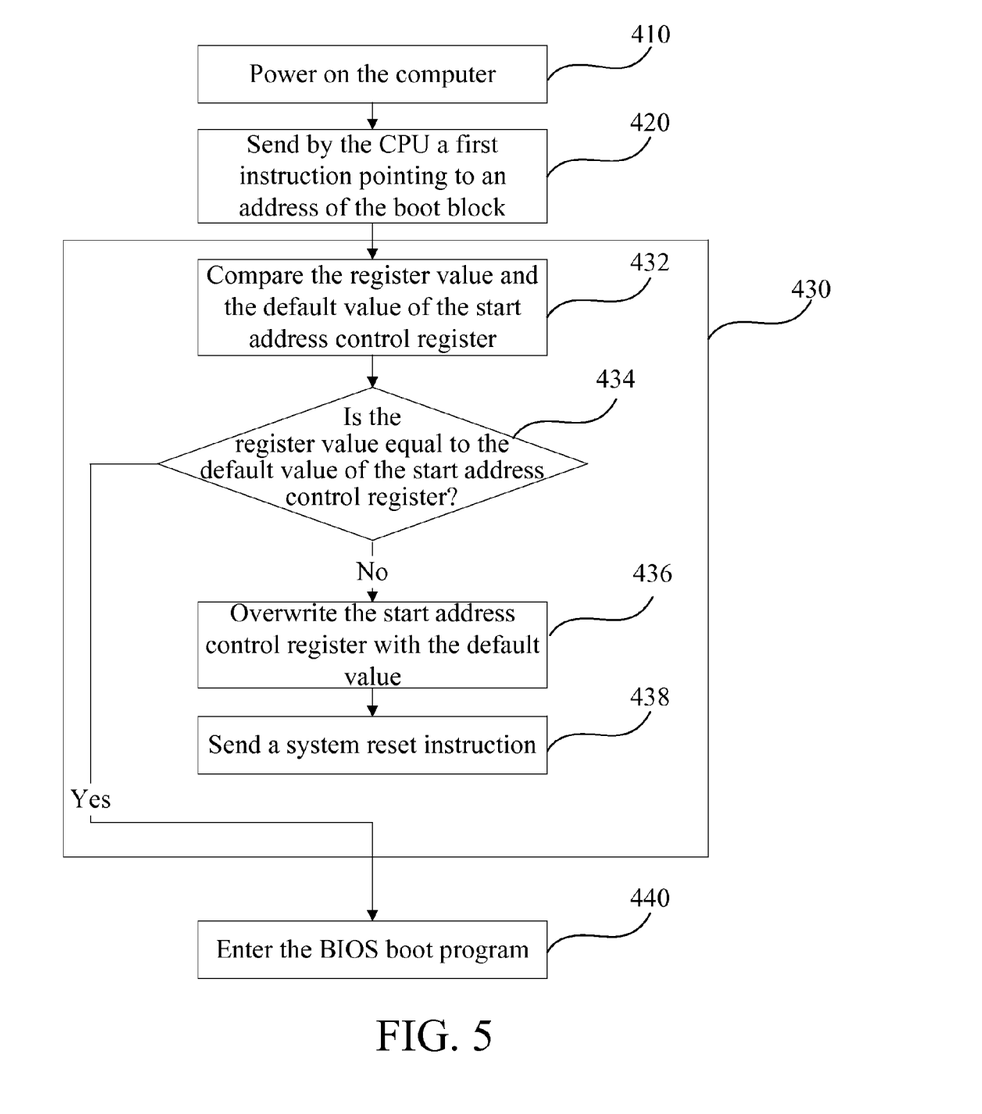
FIG. 5 is a flow chart of a method for preventing a BIOS from failing to enter a boot program according to a first embodiment of the present invention, in which a TSB register default value check program is written into the BIOS program.

FIG. 5 is a flow chart of a method for preventing a BIOS from failing to enter a boot program according to a first embodiment of the present invention, in which a TSB register default value check program is written into the BIOS program. A computer system used herein basically includes a CPU, a BIOS memory, and a south bridge chip. The BIOS memory includes a boot block and an inverted corresponding block. The south bridge chip includes a start address register and a start address control register. A default value of the start address register is a start address. The start address control register has a register value and a default value, and is responsible for controlling a value of the start address register. A TSB is located in the start address control register. The boot block is pointed to by the start address, and adapted to record the boot program of the BIOS. The inverted corresponding block is pointed to by a corresponding start address, and a value of the corresponding start address is a stored value of the start address register when the start address control register is erroneously set. The method of FIG. 5 includes the following steps.

In Step 410, the computer is powered on.

In Step 420, the CPU sends a first instruction pointing to an address of the boot block, i.e., a value of the start address register. The default value of the start address register is the start address.

In Step 430, a TSB check program is executed. In this step, the TSB check program, written into the boot program of the BIOS, is adapted to check the register value of the start address control register and replace the register value with the default value if the register value is not equal to the default value. The TSB is a bit of the start address control register, and it can be determined whether the value of the start address control register is changed or not by checking the TSB.

In Step 440, the BIOS boot program is entered. That is, Step 106 of FIG. 1 is performed, and the boot operation of the BIOS is continuously performed.

Step 430 is an embedded program provided by the present invention. The program includes the following steps.

In Step 432, the register value and the default value of the start address control register are compared.

In Step 434, it is determined whether the register value is equal to the default value of the start address control register or not. If yes, no inversion occurs, and Step 440 is performed.

In Step 436, the start address control register is overwritten with the default value. That is, the value of the TSB is overwritten from 1 to 0.

In Step 438, a system reset instruction is sent, and the first BIOS ROM space address read by the CPU is restored after the computer is restarted.

Moreover, the present invention may also adopt a third protection mechanism to further avoid such a problem that the BIOS cannot enter the boot program due to the inversion of the TSB. As the TSB may also be inverted when the computer normally operates after being booted, the method of the present invention as shown in FIG. 5, in which the TSB is checked and modified if an error occurs before the BIOS enters the boot program, cannot prevent the TSB from being inverted after the computer is booted. Such a problem can be solved by setting a top swap lock-down bit (TSLB). The TSLB can be set. When set to 0, the TSLB is disabled; and when set to 1, the TSLB may force values of several particular bits to stay unchanged, for example, BUC.TS (offset 3414h, bit 0) compensation bit, GCS.BBS (offset 3410h, bit 11:10) compensation bit, and the like, in which the 3414H Bit 0 is the TSB.

If the TSLB is set from a default value of 0 to 1 through the BIOS when the computer is booted, the TSLB prevents the TSB from being overwritten when the computer is in a power-on state. However, as the TSLB is powered by VCC3, the value of the TSLB is cleared to 0 once the power supply is cut off. Therefore, in order to prevent the TSB from being overwritten after the computer is powered on, the present invention further adopts the third protection mechanism.

Figure 6:
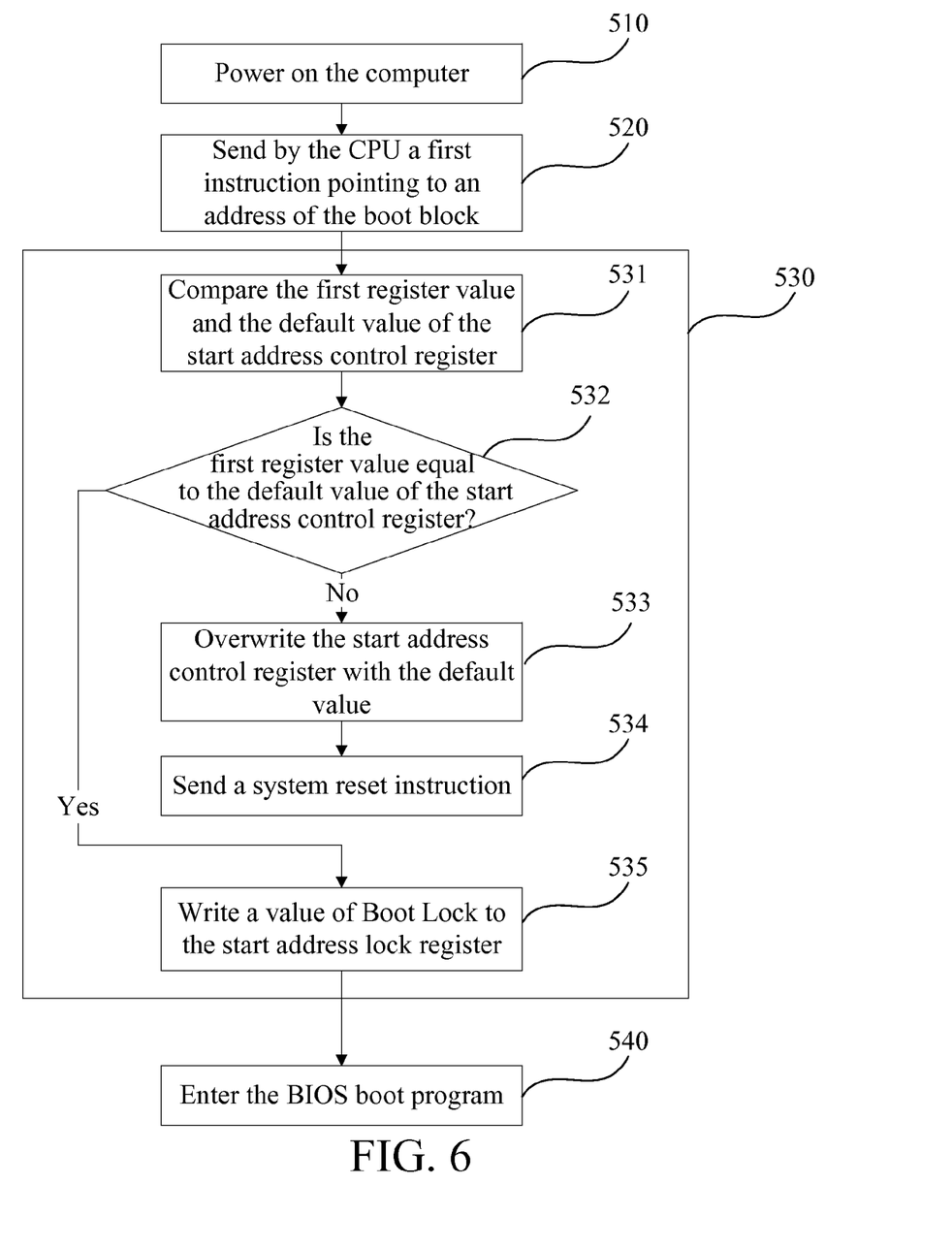
FIG. 6 is a flow chart of a method for preventing a BIOS from failing to enter a boot program according to a second embodiment of the present invention, in which a TSB register default value check program is written into the BIOS program.

FIG. 6 is a flow chart of a method for preventing a BIOS from failing to enter a boot program according to a second embodiment of the present invention, in which a TSB register default value check program is written into the BIOS program. Referring to FIG. 6, a method for preventing a BIOS from failing to enter a boot program is applicable to a computer. The computer includes a CPU, a BIOS memory, and a south bridge chip. The BIOS memory includes a boot block and an inverted corresponding block. The south bridge chip includes a start address register, a start address control register, and a start address lock register. A default value of the start address register is a start address. The start address control register has a first register value and a default value, and is responsible for controlling a value of the start address register. A TSB is located in the start address control register. The boot block is pointed to by the start address, and adapted to record the boot program of the BIOS. The inverted corresponding block is pointed to by a corresponding start address, and a value of the corresponding start address is a stored value of the start address register when the start address control register is erroneously set. The start address lock register is adapted to store a second register value and lock the first register value of the start address control register as the default value. The method of FIG. 6 includes the following steps.

In Step 510, the computer is powered on.

In Step 520, the CPU sends a first instruction pointing to an address of the boot block, i.e., a value of the start address register. The default value of the start address register is the start address.

In Step 530, a TSB check program is executed. In this step, the TSB check program, written into the boot program of the BIOS, is adapted to check the register value of the start address control register and replace the register value with the default value if the register value is not equal to the default value. The TSB is a bit of the start address control register, and it can be determined whether the value of the start address control register is changed or not by checking the TSB.

In Step 540, the BIOS boot program is entered. That is, Step 106 of FIG. 1 is performed, and the boot operation of the BIOS is continuously performed.

Step 530 is an embedded program provided by the present invention. The program includes the following steps.

In Step 531, the register value and the default value of the start address control register are compared.

In Step 532, it is determined whether the register value is equal to the default value of the start address control register or not. If yes, no inversion occurs, and Step 535 is performed.

In Step 533, the start address control register is overwritten with the default value. That is, the value of the TSB is overwritten from 1 to 0.

In Step 534, a system reset instruction is sent, and the first BIOS ROM space address read by the CPU is restored after the computer is restarted.

In Step 535, a value of Boot Lock is written to the start address lock register, so as to prevent the start address control register from being erroneously set after the computer is booted. That is, the objective of locking the value of the start address control register can be achieved, as long as the TSLB in the start address lock register is set to 1.

In the method of FIG. 6, the BIOS has two protection mechanisms for preventing the TSB from being randomly set to 1. One is to check the value of the start address control register (that is, the value of the TSB) after the CPU executes the first instruction; and the other is to set the TSLB of the start address lock register to 1 before entering the boot program so as to prevent the TSB from being inverted during the boot process. However, the two protection mechanisms may both fail, and at this time, the first protection mechanism as described in the method of FIG. 4 needs to be used.

Therefore, through the method of the present invention, once an abnormality occurs to the start address control register in the south bridge chip, the BIOS automatically executes a program to restore the register to the default value when the computer is booted, so that the user does not see the failure of the mainboard, nor needs to remove the CMOS battery or power off and then power on the computer, thereby reducing the customer complaints as well as the maintenance cost.

Moreover, according to the prevent invention, no matter in an ordinary desk-top computer, an industrial computer, a notebook, a server, or the like, any similar problem caused by an error in the BIOS execution address of the first instruction after the CPU is powered on can be solved by the method of the present invention.

The above method provided by the present invention is described through embodiments of solving the problem that the BIOS cannot enter the boot program due to the TSB of the Intel processor. It should be understood by those skilled in the art that, the method of the present invention may also be applied to solve similar problems occurring to chipsets of different manufacturers, as long as the specific position of the error in the execution address of the first instruction in the CPU and the corresponding control register are explicitly determined.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for preventing a basic input/output system (BIOS) from failing to enter a boot program, applicable to a computer, the computer comprising:
   a central processing unit (CPU), having a first instruction to be executed after the computer is powered on;
   a south bridge chip, comprising:
      a start address register, adapted to register a start address; and
      a start address control register, adapted to control a value of the start address; and
   a memory, comprising:
      a boot block, pointed to by the start address, and adapted to record the boot program of the BIOS; and
      an inverted corresponding block, pointed to by a corresponding start address, wherein a value of the corresponding start address is a value of the start address register when the start address control register is erroneously set; and
   the method comprising:
      obtaining the corresponding start address of the inverted corresponding block;
      setting a jump instruction to the corresponding start address of the inverted corresponding block, wherein the jump instruction is adapted to record the start address so as to point an execution address to the boot block;
      turning on a power supply of the computer system, and executing, by the CPU, the first instruction; and
      executing the jump instruction so as to run the boot program, when the CPU points to the corresponding start address of the inverted corresponding block.

2. The method according to claim 1, wherein when the start address control register is erroneously set, a default value of 0 of a top swap bit (TSB) of the start address control register is set to 1, and the value of the start address of the start address register is converted to the value of the corresponding start address.

3. The method according to claim 2, wherein the south bridge chip is selected from a group consisting of Intel ICH6, ICH7, ICH8, ICH9, and ICH10.

4. A method for preventing a basic input/output system (BIOS) from failing to enter a boot program, applicable to a computer, the computer comprising:
   a central processing unit (CPU), having a first instruction to be executed after the computer is powered on; and
   a south bridge chip, comprising:
      a start address register, adapted to register a start address; and
      a start address control register, having a register value and a default value, and adapted to control a value of the start address; and
   the method comprising:
      turning on a power supply of the computer system, and executing, by the CPU, the first instruction;
      comparing whether the register value is equal to the default value of the start address control register or not;
      executing the boot program, if the register value is equal to the default value; and
      replacing the register value with the default value, if the register value is not equal to the default value.

5. The method according to claim 4, wherein after the step of replacing the register value with the default value, the method further comprises: performing a system reset.

6. The method according to claim 4, wherein the step of comparing the register value with the default value of the start address control register comprises: comparing a register value of a top swap bit (TSB) of the start address control register is equal to a default value of 0 or not.

7. The method according to claim 6, wherein the south bridge chip is selected from a group consisting of Intel ICH6, ICH7, ICH8, ICH9, and ICH10.

8. A method for preventing a basic input/output system (BIOS) from failing to enter a boot program, applicable to a computer, the computer comprising:
   a central processing unit (CPU), having a first instruction to be executed after the computer is powered on; and
   a south bridge chip, comprising:
      a start address register, adapted to register a start address;
      a start address control register, having a first register value and a default value, and adapted to control a value of the start address; and
      a start address lock register, adapted to store a second register value and lock the first register value of the start address control register as the default value; and
   the method comprising:
      turning on a power supply so as to execute the first instruction;
      comparing whether the first register value is equal to the default value of the start address control register or not;
      replacing the first register value with the default value, if the first register value is not equal to the default value;
      writing a value of Boot Lock to the start address lock register, if the first register value is equal to the default value; and
      executing the boot program.

9. The method according to claim 8, wherein after the step of replacing the first register value with the default value, the method further comprises: performing a system reset.

10. The method according to claim 8, wherein the step of comparing the first register value with the default value of the start address control register comprises: comparing a register value of a top swap bit (TSB) of the start address control register is equal to a default value of 0 or not.

11. The method according to claim 10, wherein the start address lock register contains a top swap lock-down bit (TSLB) adapted to set locking of a default value of 0 for the TSB.

12. The method according to claim 10, wherein the south bridge chip is selected from a group consisting of Intel ICH6, ICH7, ICH8, ICH9, and ICH10.

13. An apparatus for preventing a basic input/output system (BIOS) from failing to enter a boot program, applicable to a computer comprising a central processing unit (CPU) and a south bridge chip, wherein
   the south bridge chip comprises:
      a start address register, adapted to register a start address; and
      a start address control register, having a first register value and a default value, and adapted to control a value of the start address; and
   the apparatus comprises a BIOS memory, and the memory contains a program comprising:
      comparing whether the first register value is equal to the default value of the start address control register or not;

executing the boot program, if the first register value is equal to the default value; and replacing the first register value with the default value, if the first register value is not equal to the default value.

14. The apparatus according to claim 13, wherein after the step of replacing the first register value with the default value, the program in the BIOS memory further comprises: performing a system reset.

15. The apparatus according to claim 13, wherein the step of comparing the first register value with the default value of the start address control register comprises: comparing a register value of a top swap bit (TSB) of the start address control register is equal to a default value of 0 or not.

16. The apparatus according to claim 13, wherein the south bridge chip is selected from a group consisting of Intel ICH6, ICH7, ICH8, ICH9, and ICH10.

17. The apparatus according to claim 13, wherein
the south bridge chip further comprises: a start address lock register, adapted to store a second register value and lock the first register value of the start address control register as the default value; and the BIOS program further comprises:

writing a value of Boot Lock to the start address lock register, if the first register value is equal to the default value; and executing the boot program.

18. The apparatus according to claim 17, wherein the start address lock register contains a top swap lock-down bit (TSLB) adapted to set locking of a default value of 0 for the TSB.

* * * * *